UNITED STATES PATENT OFFICE.

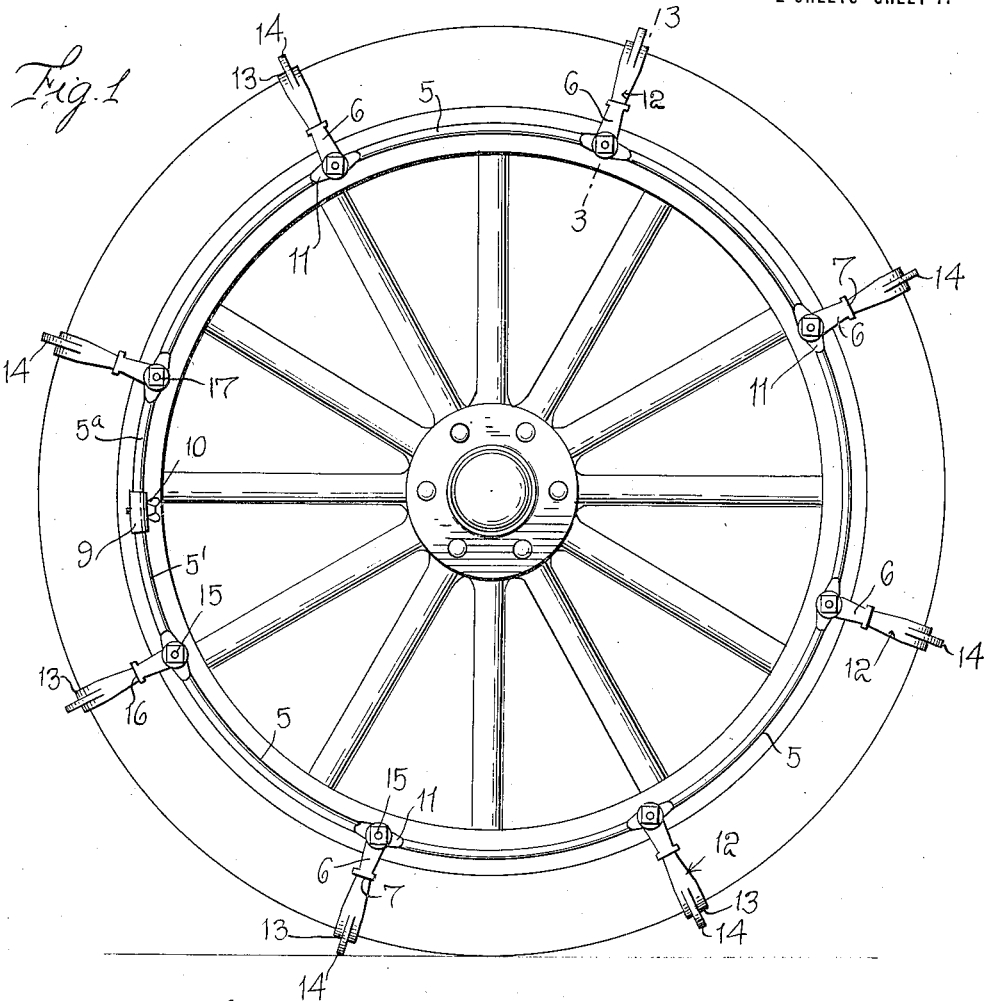
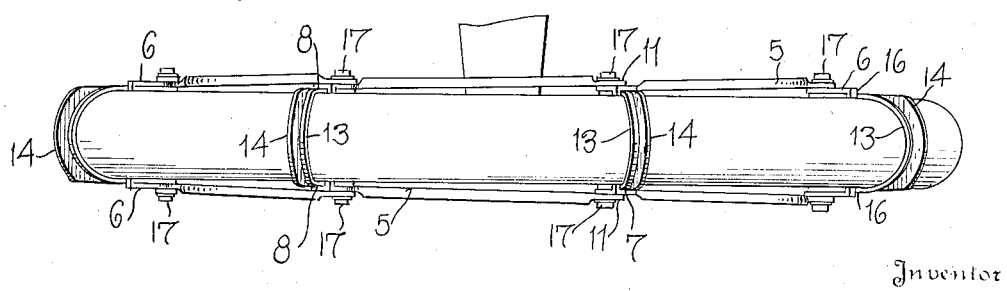

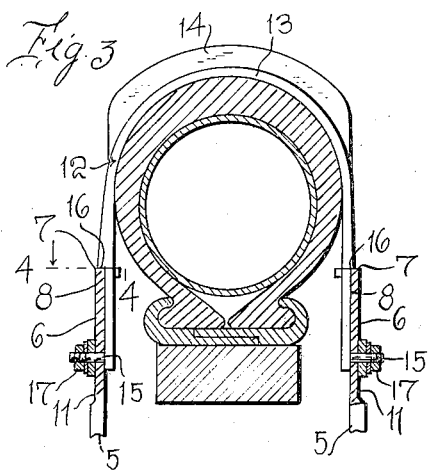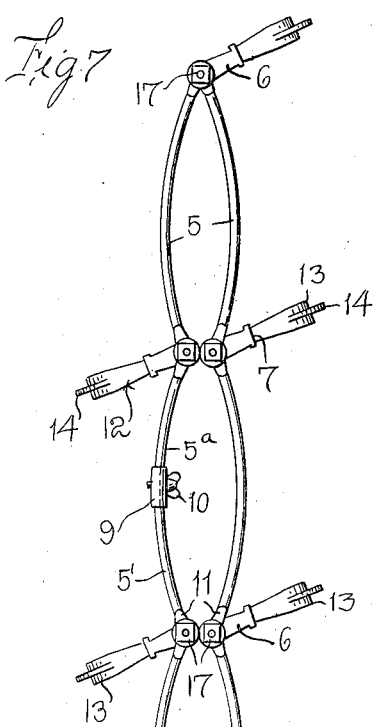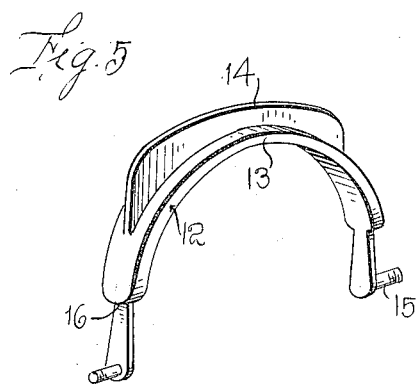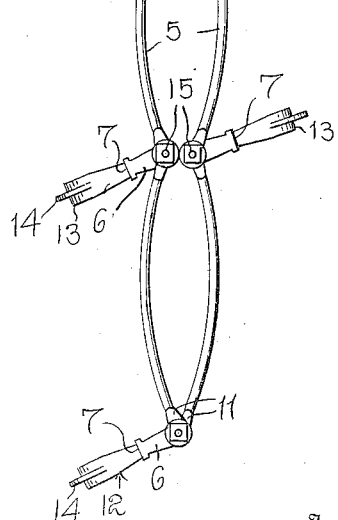

JACOB W. FINK, OF SHAMOKIN, PENNSYLVANIA.

ANTISKIDDING DEVICE.

1,295,294.

Specification of Letters Patent.

Patented Feb. 25, 1919.

Application filed December 31, 1917. Serial No. 209,683.

*To all whom it may concern:*

Be it known that I, JACOB W. FINK, a citizen of the United States, residing at Shamokin, in the county of Northumberland and State of Pennsylvania, have invented certain new and useful Improvements in Antiskidding Devices, of which the following is a specification, reference being had to the accompanying drawings.

This invention relates to an anti-skidding device and has for its primary object to provide a device which may be very easily and quickly applied to, or removed from a wheel tire, is highly effective for the purpose in view and in the operation of which there will be a minimum of wear upon the tire.

It is another and more particular object of the invention to provide an anti-skidding device for wheel tires embodying rigid complementary sections adapted to be engaged upon relatively opposite sides of the tire, and means for pivotally connecting adjacent sections including rigid tread members to extend transversely across the tire having angularly projecting terminals constituting the pivots for said sections, one of the rigid sections having means to coact with the tread member and prevent the pivotal movement of the tread member with respect to said sections.

The invention also has for a further general object to provide a device of the above character the parts of which are of very simple form and may be manufactured at small cost, said device being of such construction that it may be packed or stored away in a relatively small space within the vehicle body.

With the above and other objects in view the invention consists in the improved combination, construction and arrangement of the several parts as will be hereinafter more fully described, subsequently claimed, and illustrated in the accompanying drawings in which similar reference characters designate corresponding parts throughout the several views, and wherein;

Figure 1 is a side elevation of a vehicle wheel having my improved anti-skidding device applied to the tire thereof;

Fig. 2 is an edge view;

Fig. 3 is a section taken on the line 3—3 of Fig. 1, the tread member being shown in elevation;

Fig. 4 is an enlarged detail section taken on the line 4—4 of Fig. 3;

Fig. 5 is a perspective view of one of the tread members;

Fig. 6 is a similar view of one of the side rods; and

Fig. 7 is an elevation showing the device folded or collapsed.

Referring in detail to the drawing, 5 designates a plurality of side rods of similar construction, each of said rods being longitudinally curved and having at one end an angularly projecting arm 6. This arm at its terminal is angularly bent, as shown at 7, and formed with a recess 8 for a purpose which will hereinafter appear. A series of these rods are provided for arrangement upon each side of the tire and in connection with each series of the rods 5, a relatively short rod 5' is used which is formed likewise with the angularly extending arm, as above explained. This short rod at its other end terminates in a sleeve 9 to receive the end of a short rod 5ª. This end of the rod 5ª and the walls of the sleeve 9 are provided with openings adapted to register to receive a screw 10, said screw having threaded engagement with the wall of the sleeve. These two rod sections 5' and 5ª when thus connected, are of a length equivalent to the length of one of the main rods 5. The rods 5 and the other end of the rod 5ª are flattened at their other ends as indicated at 11 and provided with an opening therethrough.

Each tread member 12 is in the form of a rigid metal rod or bar of yoke shape, the medial curved portion of said rod being relatively wide and flattened as at 13. Upon the convex face of this widened portion of the tread member an outwardly projecting longitudinally extending road engaging rib 14 is formed. The end portions of the tread member are rectangular in cross section and are each formed with an outwardly projecting terminal pin 15 the extremity of which is threaded. Upon the outer face of the tread member, in spaced relation to the pins 15, shoulders 16 are formed.

In connecting the parts, the flattened end 11 of one of the rods 5 is engaged against the outer side of an adjacent rod at the juncture of the angular arm 6 therewith, and the pin 16 on one end of the tread member which is disposed against the inner face of the arm 6 is inserted through an opening 6' in the arm 6 and the registering opening in the flattened end 11 of the adjacent rod 5. The yoke member is engaged in the notch or recess 8, the angular terminal 7 on the arm 6 fitting against the shoulder 16 on the tread member. A washer is now engaged over the projecting end of the pin 15 and finally a nut 17 is threaded on the end of the pivot pin. Thus the rods 5 are connected for relative pivotal movement, while the tread member 12 is held by the lug 7 against a turning or pivotal movement with respect to said side rods.

In the use of my improved anti-skidding device, the several side rods and the tread members having been assembled in the manner above explained, the rods 5' and 5ª being disconnected, the device is applied upon the tire with the two series of pivotally connected rods disposed at the opposite sides thereof and the member 12 engaged upon the tire tread. The ends of the rods 5ª are then inserted in the sleeves 9 and the screws 10 engaged therewith to connect said rod sections. Thus the device is securely retained in its applied position on the tire. As the wheel revolves, the ribs 14 will come into contact with the road surface and prevent any circumferential slipping of the wheel or the lateral skidding movement thereof on the slippery surfaces. By dispensing with the use of chains commonly employed for this purpose and providing the rigid tread members, excessive wear upon the wheel tire is obviated. At the same time however, these tread members may bodily move in a radial direction in the distention and compression of the wheel tire by reason of the provision of the pivotally connected series of side rods.

When the device is not in use, it may be compactly folded or collapsed as shown in Fig. 7 of the drawings so that it will occupy comparatively little room when packed away in the body of the vehicle.

From the foregoing it will be seen that I have produced a very simple, durably constructed and serviceable anti-skidding device for wheel tires. While I have illustrated eight of the transverse thread members, it is manifest that a greater or less number may be used if desired. Other means might also be utilized for connecting the series of pivotally connected side rods and holding them in assembled relation upon the side of the vehicle tire in lieu of the sleeve and fastening screw herein referred to. The several other structural parts of the device are also susceptible of many modifications, and it is therefore to be understood that I reserve the privilege of adopting all such legitimate changes as may be fairly embodied within the spirit and scope of the invention as claimed.

Having thus fully described my invention what I claim and desire to secure by Letters Patent is:—

An anti-skidding device for vehicle wheels including two series of rigid rods adapted to be arranged upon relatively opposite sides of a wheel tire, each of said rods having an arm on one end to extend in an outward, radial direction and terminating in an angular lug provided with a recess, rigid tread members adapted to be arranged transversely of the tire and provided with outwardly projecting terminal pins upon which adjacent side rods are detachably engaged, the recessed lugs on said arms being adapted to receive the tread members, and said tread members having shoulders engaged by said lugs, said lugs preventing angular movement of the tread members upon the wheel tire with respect to said rods.

In testimony whereof I hereunto affix my signature in the presence of two witnesses.

JACOB W. FINK.

Witnesses:
 BURR HULL,
 HARVEY MORGAN.